United States Patent [19]

Poumellec et al.

[11] Patent Number: 5,106,176
[45] Date of Patent: Apr. 21, 1992

[54] OPTICAL FIBER FOR FREQUENCY CONVERSION

[75] Inventors: Bertrand Poumellec, Gif Sur Yvette; Jacques Auge, Saint Cheron; Hervé Fevrier, Massy; Jean-Michel Gabriagues, La Norville, all of France

[73] Assignee: Alcatel n.V., Amsterdam, Netherlands

[21] Appl. No.: 495,830

[22] Filed: Mar. 12, 1990

[30] Foreign Application Priority Data

Mar. 16, 1989 [FR] France ............... 89 03475

[51] Int. Cl.⁵ ............... G02B 6/16; G02F 1/37
[52] U.S. Cl. ............... 359/329; 359/328; 359/332; 385/122; 385/124
[58] Field of Search ............... 307/425–430; 350/96.15, 96.29, 96.30, 96.31, 96.32, 96.33, 96.34

[56] References Cited

U.S. PATENT DOCUMENTS

| | | | |
|---|---|---|---|
| 4,082,420 | 4/1978 | Shiraishi et al. | 350/96.31 |
| 4,838,638 | 6/1989 | Kamiyama et al. | 350/96.33 X |
| 4,877,304 | 10/1989 | Bhagavatula | 350/96.29 |
| 4,893,888 | 1/1990 | Okazaki et al. | 307/425 X |
| 4,909,595 | 3/1990 | Okazaki et al. | 350/96.29 |
| 4,952,013 | 8/1990 | Harada et al. | 350/96.30 |

OTHER PUBLICATIONS

Electronics Letters, vol. 24, No. 14, Jul. 7, 1988, pp. 894–895, M. E. Fermann et al. "Frequency-Doubling by Modal Phase Matching in Poled Optical Fibers".
Electronics Letters, vol. 23, No. 7, Mar. 26, 1987, pp. 322–324, M. C. Farries et al. "Second-Harmonic Generation in an Optical Fiber by Self-Written X$^{(2)}$ Grating".
Applied Physics Letters, vol. 39, No. 6, Sep. 81, pp. 466–468, N.Y. USA; Y. Sasaki et al., "Phase-Matched Sum-Frequency Light Generation".
Optics Letters, vol. 13, No. 9, Sep. 88, pp. 773–775; M. A. Saifi et al. Second-Harmonic Generation in SIngle-Mode and Multimode Fibers.
Patent Abstracts of Japan, vol. 7, No. 67, Mar. 19, 83, p. 184, 1212. Nippon Denshin (#57-211125).

*Primary Examiner*—John D. Lee
*Attorney, Agent, or Firm*—Christie, Parker & Hale

[57] ABSTRACT

An optical fiber for frequency conversion, has an annular index profile structure for obtaining zero order phase matching and optimum overlap between the fibers's resonant propagation modes, one propagating the wave w and the other the wave kw where $2 \leq k \leq 4$ for at least one wavelength lying in the range 0.4 $\mu$m to 2.6 $\mu$m, with the index step $\delta n$ in the ring lying in the range $2 \times 10^{-2}$ and $5 \times 10^{-2}$, the inside radius $r_i$ of the ring lying in the range 0.5 $\mu$m to 1.5 $\mu$m, and the outside radius $r_e$ of the ring lying in the range 2 $\mu$m to 3.5 $\mu$m.

6 Claims, 5 Drawing Sheets

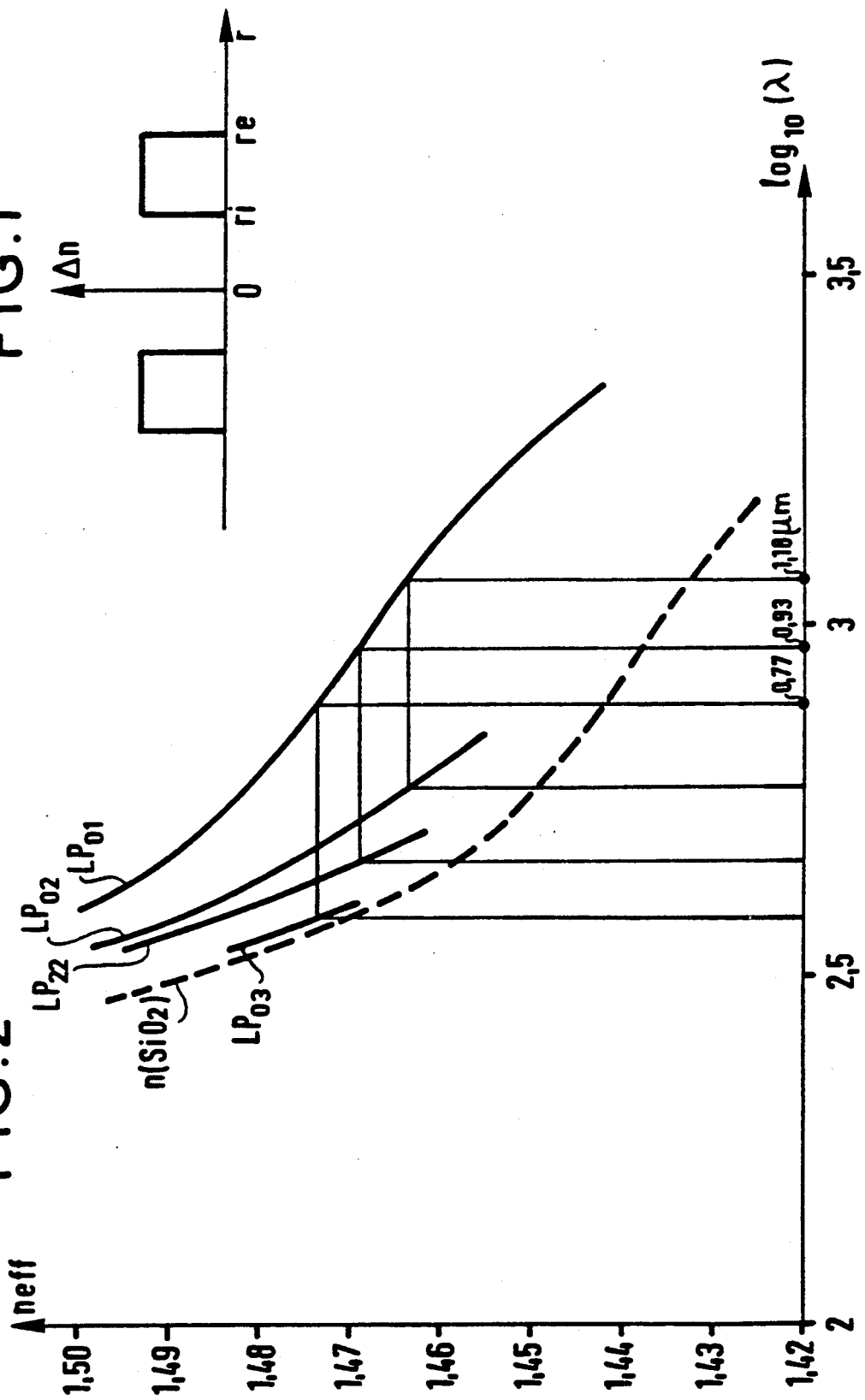

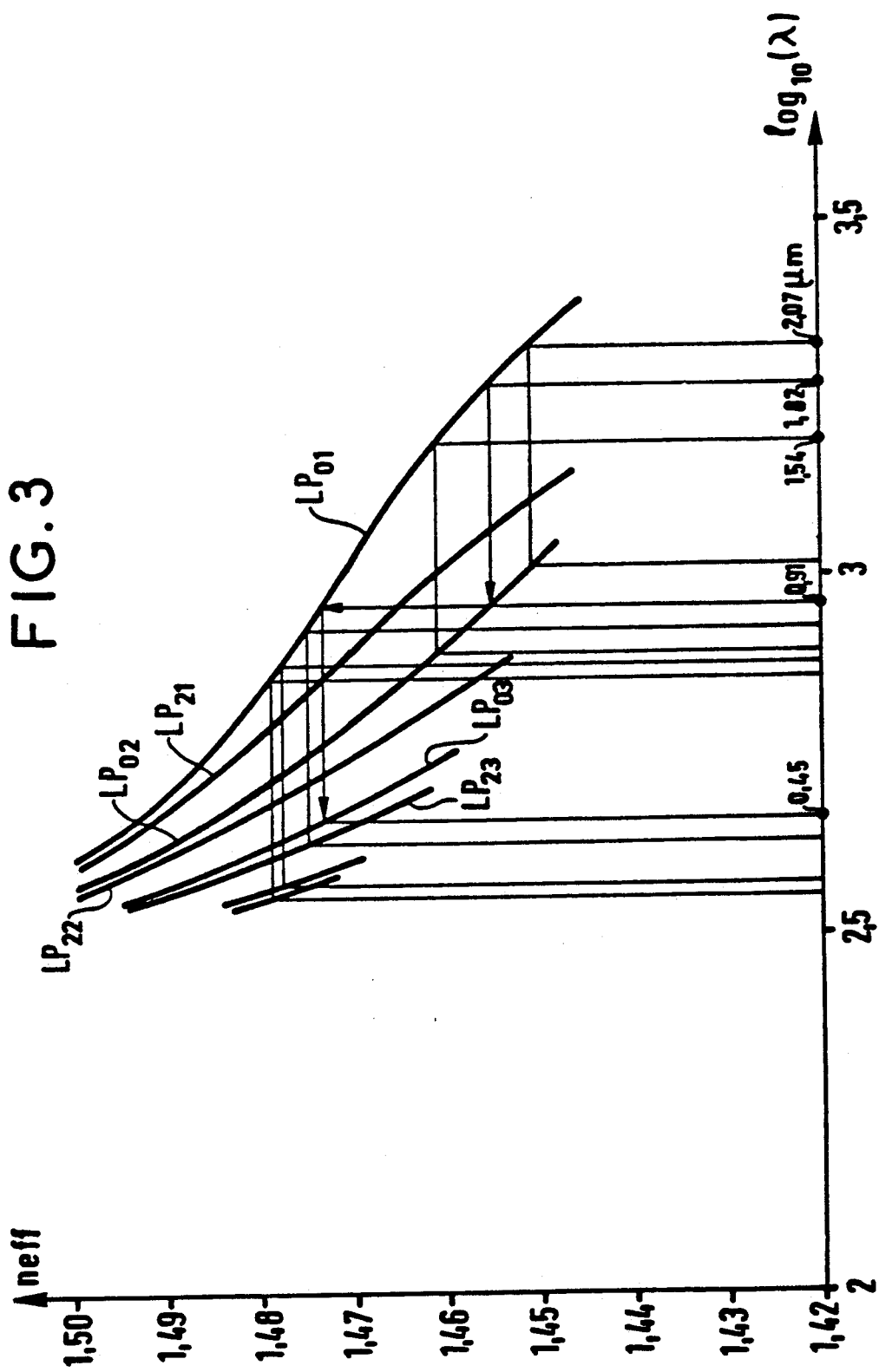

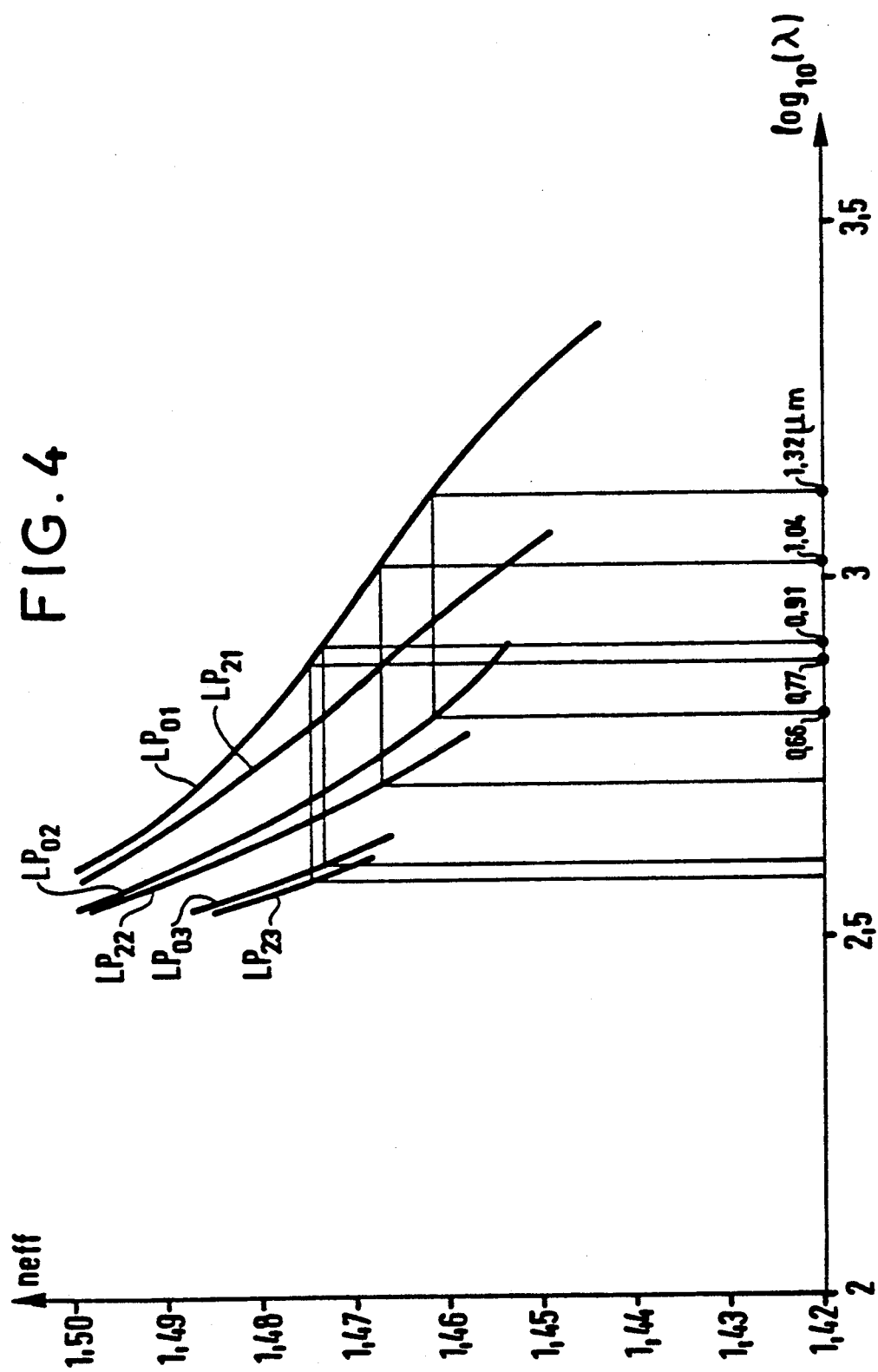

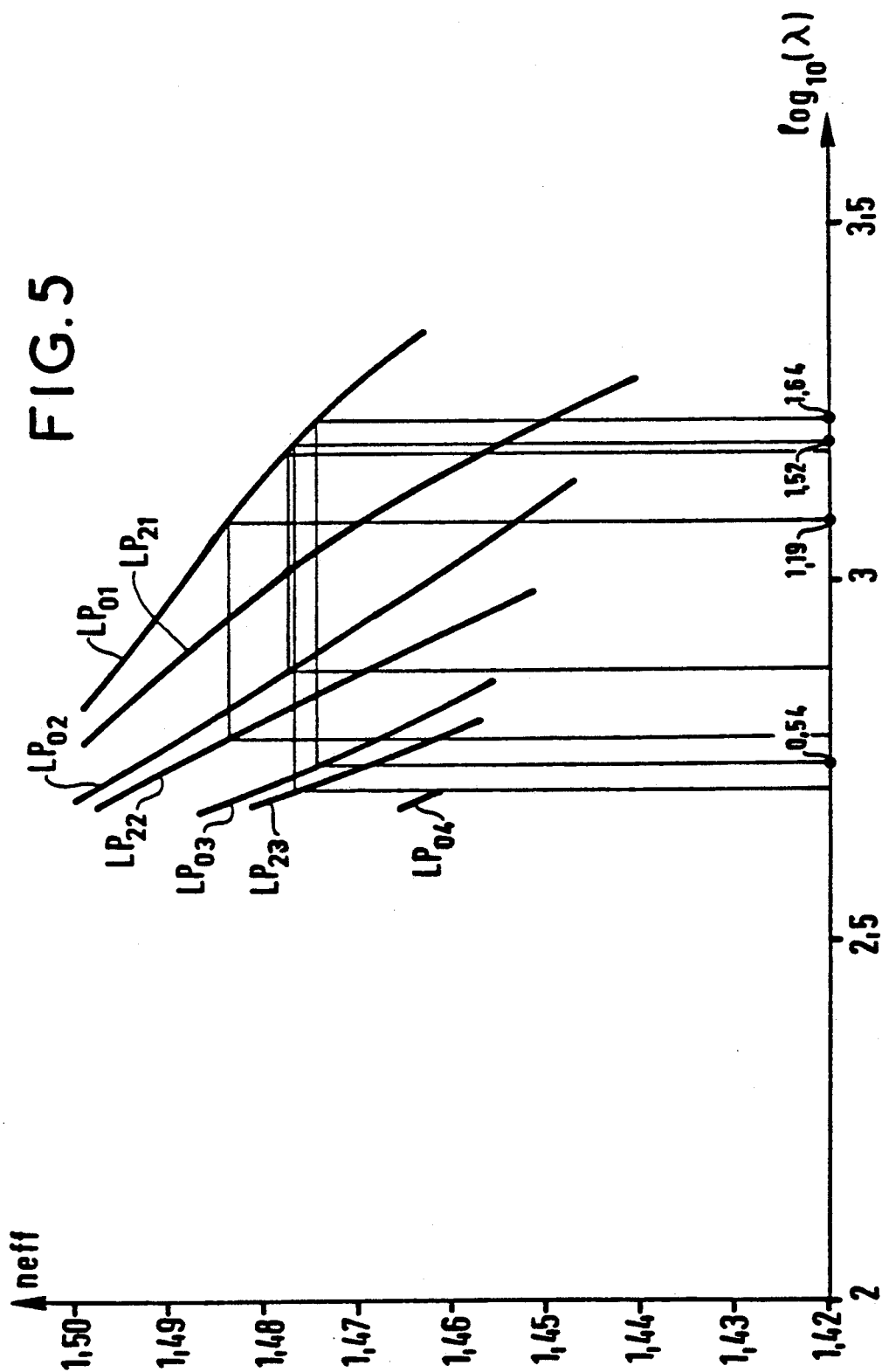

OPTICAL FIBER FOR FREQUENCY CONVERSION

The present invention relates to an optical fiber for frequency conversion, in particular for frequency doubling and tripling.

Frequency doubling in a material is a property of the material whereby it converts a beam of frequency $\omega$ into a beam of frequency $2\omega$. If $\omega$ corresponds to a wavelength of 1064 nm, then the harmonic lies in the green at 532 nm. This is a non-linear second order effect.

The doubling phenomenon is forbidden in materials possessing a center of inversion, e.g. homogeneous glasses. It is therefore necessary to break this symmetry in the fiber in order to observe this conversion. The article by M. E. Fermann, L. Li, M. C. Farries and D. N. Payne entitled "Frequency-doubling by modal phase matching in poled optical fibers", published in Electronics Letters 7/1988, 24 No. 14, p. 894, specifies that the fiber must possess active sites such as point defects located on or around atoms of germanium or phosphorus which are highly asymmetrical, i.e. giving rise to considerable hyperpolarizability. However, these sites must be distributed in a manner which is not centrosymmetrical so as to ensure that the non-linear susceptibility is not zero.

The problem that arises is obtaining a high degree of conversion efficiency. To do this, it is necessary for the pumping wave and the emitted wave to travel at the same speed, i.e. the effective indices of the fiber at $\omega$ and at $2\omega$ should be equal.

At present, known fibers do not satisfy this condition. They satisfy a different condition giving rise to less intense conversion: this condition is the coefficient of non-linearity being modulated in the z direction by a periodic function of period $\lambda$, where:

$$\lambda = \frac{\lambda_p}{2|n_{eff}(2w) - n_{eff}(w)|} \approx 15 \ \mu m \ \text{to} \ 30 \ \mu m$$

(See the article by M. C. Farries, P./ St. J. Russel, M. E. Fermann and D. N. Payne entitled "Second harmonic generation in an optical fiber by self written $X^{(2)}$ grating", published in Electronics Letters (1987) 23 (7), pp. 322-323.) This article describes generating second and third harmonics in optical fibers having a step index profile (or a triangular profile) obtained by forming such a grating. The breaking of symmetry required for doubling is produced spontaneously or artificially by interaction of the material with light at $3\omega$ or at $2\omega$. Local susceptibility at the point (r, $\theta$, z) is constructed from this interaction; its three-dimensional distribution is determined by the overlap of the modes that support the waves $\omega$ and $2\omega$. Since the propagation mode of w is imposed, the mode for $2\omega$ is free ab initio, and is determined by a condition for maximizing overlap. Nevertheless, conversion efficiency remains low, about 1%.

The object of the present invention is to provide an optical fiber whose conversion efficiency is much greater than that of optical fibers known in the past.

The present invention provides an optical fiber for frequency conversion, characterized by the fact that it has an annular index profile structure for obtaining zero order phase matching and optimum overlap between the fiber's resonant propagation modes, one propagating the wave $\omega$ and the other the wave $k\omega$ where $2 \leq k \leq 4$ for at least one wavelength lying in the range 0.4 $\mu$m to 2.6 $\mu$m, with the index step $\delta n$ in the ring lying in the range $2\times10^{-2}$ and $5\times10^{-2}$, the inside radium $r_i$ of the ring lying in the range 0.5 $\mu$m to 1.5 $\mu$m, and the outside radius $r_e$ of the ring lying in the range 2 $\mu$m to 3.5 $\mu$m.

Preferably, for frequency doubling, $\delta n$ lies in the range $2\times10^{-2}$ and $3\times10^{-1}$.

Preferably, for frequency tripling, $\delta n$ lies in the range $3\times10^{-2}$ and $5\times10^{-2}$.

The present invention also provides a laser that makes use of the above-defined fiber.

Other characteristics and advantages of the present invention appear from the following description of embodiments given by way of non-limiting example. In the accompanying drawings:

FIG. 1 is a highly diagrammatic representation of the index step $\delta n$ in an optical fiber whose core radius is r.

FIGS. 2 to 5 are graphs showing the effective index $n_{eff}$ of modes existing in fibers of the invention that differ in their indices or in the sizes of their rings, with effective index being plotted as a function of wavelength ($\log_{10}\lambda$)

Figure 6:
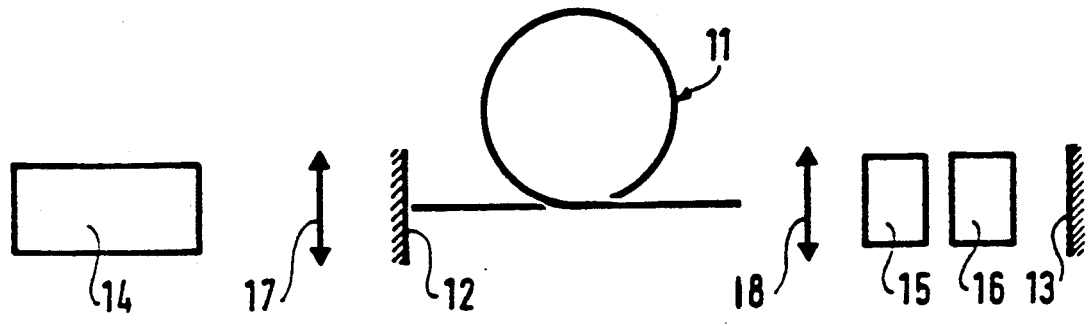
FIG. 6 is a block diagram of a laser including an optical fiber of the invention.

FIG. 1 is a highly diagrammatic representation of index variations in the core of a silica optical fiber of the invention having an annular index profile. When r lies in the range $r = r_i$ (r interior) to $r = r_e$ (r exterior), the index increases by an amount $\delta n$. This index difference may be obtained by doping using oxides of germanium and/or phosphorus. French patent number 87 14 286 filed Oct. 16, 1987 describes a method of manufacturing such a fiber.

FIGS. 2 to 5 are graphs showing variations in the effective index $n_{eff}$ (plotted up the Y axis) as a function of wavelength $\lambda$ ($\log_{10}\lambda$ plotted along the X axis) for various propagation modes in fibers having different $\delta n$, $r_i$, and $r_e$. $LP_{01}$, $LP_{02}$, $LP_{03}$, and $LP_{04}$ correspond to zero order modes of azimuth 0, 1, or 2; $LP_{11}$, $LP_{12}$, $LP_{13}$, and $LP_{14}$ correspond to first order modes, $LP_{21}$, $LP_{22}$, $LP_{23}$, to second order modes, etc.

In all of these graphs, the $\log_{10}\lambda$ difference for two modes having the same effective index is $\log_{10} 2$ (i.e., approximately 0.3) for $\omega$ and $2\omega$. It is $\log_{10} 3 1$ (i.e., approximately 0.5) for $\omega$ and $3 \omega$.

In all cases, a wave $\omega$ is injected into the fiber in mode $LP_{01}$.

FIG. 2 also includes a curve showing the variation of the index n of silica $SiO_2$ as a function of $\lambda$.

EXAMPLE I

A fiber was taken having an outside diameter of 125 $\mu$m with a ring having an index step $\delta n = 3\times10^{-2}$, an inside ring radius $r_i$ equal to 0.66 $\mu$m and an outside radius $r_2$ equal to 2 $\mu$m. By moving along the $LP_{01}$ dispersion curve (FIG. 2) it can be seen that optimum matching for conversion from $\omega$ to $2\omega$ takes place at $\lambda = 1.18$ $\mu$m. Secondary tuning points exist at 0.93 $\mu$m between $LP_{01}$ and $LP_{22}$, and at 0.77 $\mu$m between $LP_{01}$ and $LP_{03}$.

EXAMPLE II

A fiber was taken having an outside diameter 125 $\mu$m and a ring having an index step $\delta n = 3\times10^{-2}$, the inside radius being equal to 1 $\mu$m and the outside radius being equal to 3 μm. It can be seen in FIG. 3, that zero order phase matching and optimum mode overlap for ω and 2ω exist over a very wide range of wavelengths, from 1.54 μm to 2.07 μm, i.e. about 0.5 μm.

Such a solution is most advantageous since such a fiber is not selective and phase matching is not critical.

For constant δn, while causing $r_i$ and $r_e$ to vary over the ranges specified above, anon-critical range of wavelengths of up to 0.4 μm can be found. At constant δn, there is always a pair ($r_i$, $r_e$) within the ranges mentioned above for which a non-critical range of wavelengths of up to 0.4 μm can be found for the desired wavelength. The non-critical range shifts towards shorter wavelengths as the thickness of the ring diminishes.

Such a non-critical range of wavelengths makes it possible to obtain frequency doubling even when pumping sources present a degree of dispersion in emission frequency due to manufacturing tolerances.

EXAMPLE III (see FIG. 4)

A fiber was used having the same $δn = 3 \times 10^{-2}$, the inside radius $r_i$ was equal to 1 μm and the outside radius $r_e$ was equal to 2.5 μm. Optimum matching was still obtained between $LP_{01}$ and $LP_{02}$ for 1.32 μm, together with secondary matching for 104 μm, 0.91 μm, and 0.77 μm.

Examples II and III show that starting from a wavelength such as 1.32 μm or 1.54 μm, i.e. within the telecommunications window, there exists a fiber structure having a ring and $δn = 3 \times 10^{-2}$ for which it is possible to obtain optimum matching for ω and 2ω.

EXAMPLE IV

Returning to the fiber of Example II and the graph of FIG. 3, such a fiber may provide matching enabling conversions in cascade: a first conversion from 1.82 μm to 0.91 μm ($LP_{01}$ to $LP_{02}$), followed by energy transfer at 0.91 μm from $LP_{02}$ to $LP_{01}$, followed by conversion from 0.91 μm to 0.45 μm ($LP_{01}$ to $LP_{03}$).

EXAMPLE V

A fiber was used having $δn = 5 \times 10^{-2}$, with an inside radius $r_i$ of 1 μm and an outside radius $r_e$ of 3 μm. δn of this value may be obtained using oxides of germanium or phosphorus as dopants (see the article by R. B. Dyott, J. R. Cozens, D. G. Morris entitled "Preservation of polarization in optical fiber waveguides with elliptical cores" published in Electroncis Letters 21/1979, 15, No. 13, pp. 380-382). The graph of FIG. 5 shows a matching optimum between ω and 3ω for $λ = 1.64$ μm and for $λ = 0.546$ μm. It may be observed that there is simultaneous matching between ω and 2ω and between ω and 3ω for 1.52 μm, and secondary matching between ω and 2ω for 1.19 μm.

In all of the preceding examples, conversion efficiency for 2ω is not less than 50% with a pumping wave of about 400 watts and a fiber that is a few meters long.

An additional feature of fibers of the invention should also be observed. These fibers always have large δn, of not less than $2 \times 10^{-2}$. In such cases, a small degree of ellipticity nearly always appears in practice during manufacture as can be measured by birefringence, and this ellipticity turns out to be advantageous for facilitating phase matching. The fiber has slightly different effective indices along two orthogonal axes and this provides a little latitude in the wavelength values.

In general, for all annular fibers of the invention, there always exists a wavelength lying in the range 0.4 μm to 2.6 μm for which there is a matching optimum between ω and 2ω. conversely, if the wavelength is specified, then it is always possible to find at least one fiber of the invention for which optimum matching occurs between ω and 2ω.

A most advantageous application of fibers of the invention lies in converting the optical frequencies used in optical telecommunications windows (800 nm, 1300 nm, 1550 nm, and 2550 nm) so as to facilitate detection thereof.

A fiber of the invention is particularly advantageous in an optical fiber autocorrelator.

The technique of optical autocorrelation for evaluating the duration of ultra-short light pulses emitted in the infrared is described, in particular, in the article by U. Osterberg and W. Margulis, entitled "Autocorrelation of short pulses using a single mode fiber" published in IEEE J. Quant. Electroncis, QE-24, October 1988, pp. 2127-2129.

There follows a description of a laser making use of an optical fiber of the invention. Optical fiber lasers are already known. They include fibers doped with various rare earths. Table I below shows the ions already in use and the corresponding emission wavelengths.

TABLE I

| Ion | Laser λ (μm) |
|---|---|
| $Nd^{3+}$ | 0.94/1.06-1.09/1.4 |
| $Er^{3+}$ | 1.54 |
| $Tm^{3+}$ | 1.8 |
| $Pr^{3+}$ | 1.07 |
| $Sm^{3+}$ | 0.65 |
| $Yb^{3+}$ | 1.02-1.14 |

When a doped fiber laser of this type is operated under mode locked triggered conditions, for example, the peak power inside the cavity at the laser wavelength may be as much as 6 kW to 7 kW (see the article by I. N. Duling, L. Goldberg, J. F. Weller published in Electronics Letters, 24 (1988), p. 1333).

In the past, if an emission wavelength was desired in the visible spectrum, a frequency doubler device was placed outside the cavity.

In a laser making use of a fiber of the invention, the fiber is used both as a laser amplifier medium and as an intracavity frequency doubler.

The block diagram of FIG. 6 shows a segment of fiber 11 of the invention doped with a lanthanide ion, two mirrors 12 and 13 defining an optimum resonator, a pumping source 14 matching the doping in the fiber under consideration, with injection taking place into the segment of fiber 11 by means of a focusing device 17. The cavity may optionally contain a trigger 15, a mode locking device 16, and collimating optics 18. The transmittance of the inlet mirror 12 is maximal at the pumping wavelength and minimal at the laser wavelength λ and at the wavelength λ/2. The transmittance of the outlet mirror is minimal at the pumping wavelength and at the laser wavelength λ and it matches the wavelength λ/2 for the utilization under consideration.

If a laser emission wavelength is selected, than a rare earth ion is selected (cf. Table I). This fixes a pumping wavelength compatible with a silica-based fiber doped with the selected rare earth ion. Given the emission wavelength of the laser, the parameters of the germanium doped silica ring corresponding to the core of the invention suitable for obtaining frequency doubling of the laser emission can then be defined. It is then possible to determine the $LP_{01}$ profile and consequently to determine the most effective distribution of the rare earth ion in the fiber.

By way of example, a fiber of the invention doped with neodymium could be used. In this case, a pumping wavelength of 0.82 μm (0.8 μm $\leq \lambda p \leq$ 0.830 μm) could be used. This wavelength may be delivered by a pumping source constituted by an array of power laser diodes.

Depending on the exact composition of the vitreous matrix of the optical fiber under consideration, the emission wavelength of the neodymium laser lies in the range 1.06 μm to 1.09 μm. When using a fiber of the invention which is highly doped with germanium, the laser emission wavelength is close to 1.09 μm.

By causing this laser to operate under locked mode conditions and under triggered mode conditions, the highest peak pulse power may be around several kilowatts within the optical fiber. At this power level, the conversion efficiency may be about 50%. The resulting wavelength is about 0.545 μm.

Naturally the invention is not limited to the embodiments described above.

We claim:

1. An optical fiber for frequency conversion, characterized by the fact that it has an annular index profile structure for obtaining zero order phase matching and optimum overlap between the fiber's resonant propagation modes, one propagating the wave $\omega$ and the other the wave $k\omega$ where $2 \leq k \leq 4$ for at least one wavelength lying in the range 0.4 μm to 2.6 μm, with the index step $\delta n$ in the ring lying in the range $2 \times 10^{-2}$ and $5 \times 10^{-2}$, the inside radius $r_i$ of the ring lying in the range 0.5 μm to 1.5 μm, and the outside radius $r_e$ of the ring lying in the range 2 μ to 3.5 μm.

2. An optical fiber according to claim 1, characterized by the fact that for frequency doubling, $\delta n$ lies in the range $2 \times 10^{-2}$ and $3 \times 10^{-2}$.

3. An optical fiber according to claim 1, characterized in that for frequency tripling, $\delta n$ lies in the range $3 \times 10^{-2}$ and $5 \times 10^{-2}$.

4. An optical fiber according to claim 1, characterized by the fact that it is slightly elliptical.

5. An optical fiber for frequency conversion has an annular index profile structure for obtaining zero order phase matching and optimum overlap between the fiber's resonant propagation modes, one propagating the wave w and the other the wave kw where $2 \leq k \leq 4$ for at least one wavelength lying in the range 0.4 μm to 2.6 μm, with the index step $\delta n$ in the ring lying in the range $2 \times 10^{-2}$ and $5 \times 10^{-2}$, the inside radius $r_i$ of the ring lying in the range 0.5 μm to 1.5 μm, and the outside radius $r_e$ of the ring lying in the range 2 μm to 3.5 μm, wherein the optical fiber is a laser fiber which is doped using a rare earth ion.

6. An application according to claim 5, characterized by the fact that the said fiber is doped with neodymium, the pumping source is constituted by an array of power laser diodes, and the emission wavelength is about 0.545 μm.

* * * * *

UNITED STATES PATENT AND TRADEMARK OFFICE
CERTIFICATE OF CORRECTION

PATENT NO. : 5,106,176

DATED : April 21, 1992

INVENTOR(S) : B. Poumellec; J. Auge; H. Fevrier; J.M. Gabriagues

It is certified that error appears in the above-identified patent and that said Letters Patent is hereby corrected as shown below:

On the Title Page:

[73] Assignee, change "Alcatel n.V." to -- Alcatel N.V. --.

Other Publications, line 12, after "Generation in" change "SIngle" to -- Single --.

Abstract, line 5, change "kw" to -- k$\omega$ -- (both occurrences).

Column 1, line 41, change the two occurrences of "w" to -- $\omega$ --.
Column 1, line 43, after "P." delete the "/".
Column 1, line 56, after "mode of" change "w" to -- $\omega$ --.

Column 2, line 9, change "3x10$^{-1}$" to -- 3x10$^{-2}$ --.
Column 2, line 47, after "log$_{10}$" change "3 1" to -- 3 --.

Column 3, line 8, change "anon" to -- a non --.
Column 3, line 50, change "Electroncis" to -- Electronics --.

Column 4, line 4, change "conversely" to -- Conversely --.
Column 4, line 63, after "selected," change "than" to -- then --.

UNITED STATES PATENT AND TRADEMARK OFFICE
CERTIFICATE OF CORRECTION

PATENT NO. : 5,106,176

DATED : April 21, 1992

INVENTOR(S) : B. Poumellec; J. Auge; H. Fevrier; J.M. Gabriagues

It is certified that error appears in the above-identified patent and that said Letters Patent is hereby corrected as shown below:

In the Claims

Column 6, line 5, after "range 2" change "µto" to
-- µm to --.
Column 6, line 19, change "w" to -- ω -- (both occurrences).

Signed and Sealed this

Eighteenth Day of January, 1994

BRUCE LEHMAN

*Attest:*

*Attesting Officer*          *Commissioner of Patents and Trademarks*